May 2, 1950 J. M. CHEVALIER 2,505,883
CHOKER HOOK
Filed Jan. 2, 1948

INVENTOR.
John M. Chevalier
BY
ATTORNEYS.

Patented May 2, 1950

2,505,883

UNITED STATES PATENT OFFICE 2,505,883

CHOKER HOOK

John M. Chevalier, Port Angeles, Wash.

Application January 2, 1948, Serial No. 280

7 Claims. (Cl. 294—74)

This invention relates to choker hooks for use in logging operations, and is an improvement over the hook which I illustrate and describe in Letters Patent of the United States issued to me February 4, 1941, and numbered 2,230,676. The general object is to devise a hook presenting twin bills adapting themselves to selective usage for the quick and easy attachment of the terminal eye of a choker line, and which, in consequence of said selective employment of the bills, gives to the hook unusual versatility in the manner of its application. The hook of the present invention is one which causes the tip ends of the bills to be forwardly directed and hence allows the leading end of a second choker line to be attached to the other of the two bills, a hook designed to embody a reeveway for the passage of the choker line therethrough and which by pull force imparted to the line inherently positions the hook upon the log in such a manner as to locate the bills on lines diagonal to the longitudinal axis of the log, and a hook which may be reversibly applied to enable the diagonal line of the bills to be pointed toward either side of the log selectively. The hook of the invention is further peculiarized in its generally advanced designing serving to produce guarding instrumentalities for the tips of the bills precluding the same from hanging up, effectively protecting the hook-attached eyes of the choker lines against chafing wear, and assuring a stable positioning of the hook upon the log.

The invention consists in the novel construction and in the adaptation and arrangement of parts hereinafter described and claimed.

Figure 1:
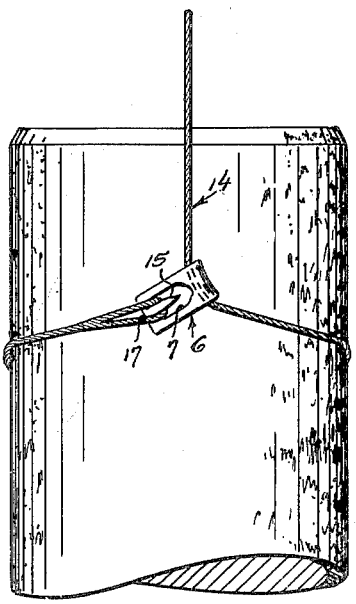
Figure 1 is a plan view illustrating a choker hook constructed in accordance with the preferred embodiment of the present invention and shown as having been applied in securing a choker-cable to a log, the cable and the log being shown fragmentarily.
Figure 2:
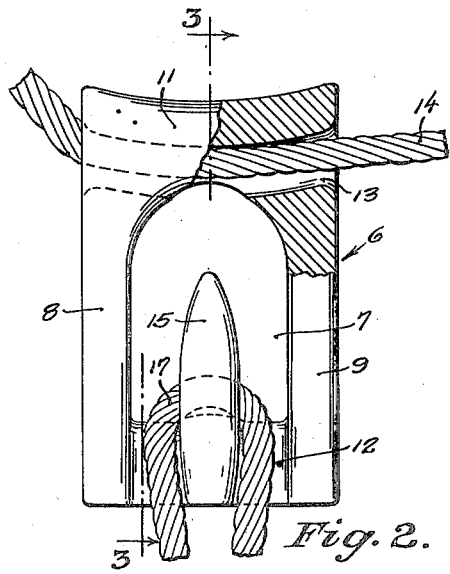
Fig. 2 is a plan view of the hook taken to an enlarged scale and with parts broken away and shown in section, a fragmentary showing of the cable being likewise incorporated in this view.

With reference being had to said drawing, the numeral 6 generally denotes the body of my improved hook, and which is a steel forging or casting formed in one piece to an approximately rectangular plan configuration, and made with a central opening 7 boxed in along the sides by flanking walls 8 and 9 and along the ends by a head wall 11 and a foot wall 12. The head wall presents a transverse bore 13 serving as a reeveway for the cable 14. The foot wall is in the nature of a web reduced somewhat from the thickness of the flanking walls at its points of juncture with the latter, and having this web semi-parabolic in sectional configuration or which is to say produced to suggest the major section of a conoid locating the flat side outermost. At a point substantially central to the width of this web and extending forwardly therefrom along the major axis of the body, one stemming from the top and the other from the bottom face of the web, there are provided a pair of horn-like bills 15 and 16, and these bills taper toward the toe or tip ends and have these tips hooked inwardly beyond the planes occupied by the top and bottom edges of the flanking walls 8 and 9. The throat described between the tip ends of the bills is sufficient to allow the cable, or which is to say the bite formed by a terminal eye 17 of the latter, to be readily introduced therethrough, and the spacing between the tip ends of the bills and the inner face of the head wall 11 is such as to permit this bite to be fed freely into the throat.

The backs of the bills protrude prominently beyond the cable-seating top and bottom surfaces of the web, sufficient in fact to project well beyond the outer limit of a cable eye engaged over the bill. The purpose thereof is two-fold, firstly that of causing the prominence of the bill which lies upon the underside of an applied choker-hook to dig into the surface bark of a log and complement the choker action as a means of stabilizing the log-choking loop of the cable against endwise slippage, and secondly that of minimizing liability of an applied cable eye being chafed, either by the log itself in those instances where the cable eye is applied over the bottom-side bill or by foreign objects in those instances where the cable eye is applied over the topside bill. By arching the exposed prominences of the bills and otherwise generally stream-lining the body, the choker hook readily slips by obstructions encountered along the path of the log's travel.

Figure 5:
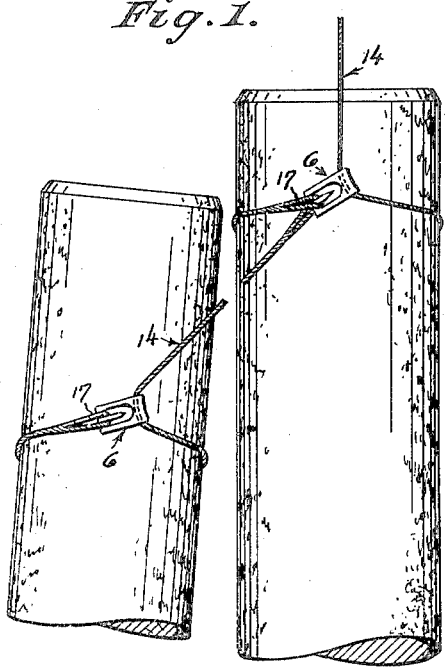
Fig. 5 is a view similar to Fig. 1 but taken to a somewhat smaller scale and illustrating the manner of applying several said choker hooks each to a respective one of a severalty of ganged logs.
Figure 3:
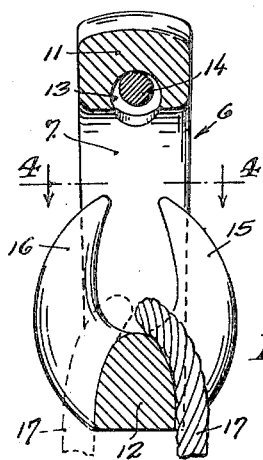
Fig. 3 is a longitudinal vertical section on the jogged section line 3—3 of Fig. 2, and portraying by dotted lines the manner in which an eye formed upon the lead end of a second choker-cable is applied to the hook.
Figure 4:
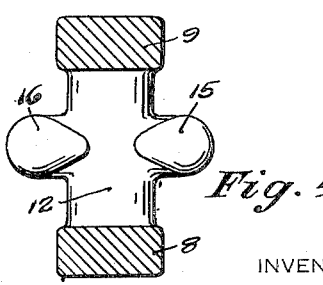
Fig. 4 is a transverse vertical section on line 4—4 of Fig. 3 with the cable deleted.

The choker lines used with the present choker hook provide an eye upon each of the two ends and by passage of the line through the reeveway 13 of a related hook become permanently associated one with the other. When applying the hook, one end of the choker line is given a turn about the log and the terminal eye hooked over one of the two bills, it being usual to apply the eye to the upper or exposed bill. The other eye of the choker line is then coupled to the main drag line, which is customarily powered either from a crawler-type tractor or from a stationary donkey, and as slack is taken up the choker line is drawn taut about the log. The choker hook inherently positions itself upon the log much in the manner in which it is shown in Fig. 1; and which is to say with the major axis of the hook disposed diagonal to the longitudinal axis of the log, pointing either to the left or to the right according as to the direction in which the looping throw is initiated. Where it is desired to draw two or more logs in ganged echelon, separate choker lines are employed in the manner indicated in Fig. 5, looping and hooking a following choker line about a second, third, or fourth log, as the case may be, and attaching the free eye to the other of the two bills presented by the choker hook of the preceding choker assembly. As will, it is believed, be readily apparent from an inspection of Fig. 5, the ability to reverse the choker hooks assures that the take-off bill of a leading log will substantially align itself with the direction of pull transmitted to the trailing log of an echelon series.

While I have illustrated and described the invention in the form which I believe best exemplifies it, it is to be expected that minor changes in structural details may be resorted to without departing from the spirit of the invention, and I therefore intend that the hereto annexed claims be given the broadest interpretation which the language fairly permits.

What I claim is:

1. A logging hook for use with a choker line having a terminal eye, and comprising a block body presenting a central opening boxed in along the sides by guard walls and along the ends by foot and head walls and with the head wall having a reeve-way extending transversely therethrough for the passage of the choker line, the hook being provided with twin longitudinally extending bills adapted to be selectively engaged by the eye of the choker line and made integral with the foot wall to extend therefrom toward the head wall along the major axis of the block one at the front and the other at the back of the block and with the tips of said bills lying within the guarded limits prescribed by the top and bottom surfaces of the side walls.

2. A logging hook for use with a choker line having a terminal eye, and comprising a block body presenting a central opening boxed in along the sides by guard walls and along the ends by foot and head walls and with the head wall having a reeve-way extending transversely therethrough for the passage of the choker line, the hook being provided with twin longitudinally extending bills adapted to be selectively engaged by the eye of the choker line and made integral with the foot wall to extend therefrom toward the head wall along the major axis of the block one at the front and the other at the back of the block and with the tips of said bills being hooked inwardly and lying within the guarded limits prescribed by the top and bottom surfaces of the side walls.

3. A logging hook for use with a choker line having a terminal eye, and comprising a block body presenting a central opening boxed in along the sides by guard walls and along the ends by foot and head walls and with the head wall having a reeve-way extending transversely therethrough for the passage of the choker line, the hook being provided with twin longitudinally extending bills adapted to be selectively engaged by the eye of the choker line and made integral with the foot wall to extend therefrom toward the head wall along the major axis of the block one at the front and the other at the back of the block, the backs of said bills being arched and protruding prominently beyond planes occupied by the top and bottom limits of the side walls with the tips hooked inwardly and terminating within the guarded limits described between said planes.

4. The logging hook of claim 3 in which the foot wall is cut away at opposite sides of the root ends of the bills to form recessed seats for the choker eye and wherein the arched prominences of the bills protrude to a degree sufficient to bring the outer limit of the bills beyond the outer limit of the seated choker eye.

5. The logging hook of claim 3 in which the foot wall, sectionally considered, suggests the major section of a conoid placing the flat side outermost.

6. A logging hook for use with a choker line having a terminal eye, and comprising a block body presenting a central opening flanked by guard walls with means being provided at the head end of the block to establish slip engagement with the choker line proper and at the other end providing a foot wall joining said flanking walls, the hook being provided with twin bills adapted to be selectively engaged by the eye of the choker line and made integral with the foot wall to extend longitudinally therefrom along the major axis of the block toward the head end of the block with one said bill lying at the front and the other said bill at the back of the block, the tips of said bills lying within the guarded limits prescribed by the top and bottom surfaces of the side walls.

7. The logging hook of claim 6 in which the backs of said bills are arched and protrude prominently beyond planes occupied by the front and back limits of the side walls.

JOHN M. CHEVALIER.

REFERENCES CITED

The following references are of record in the file of this patent:

UNITED STATES PATENTS

| Number | Name | Date |
|---|---|---|
| 2,230,676 | Chevalier | Feb. 4, 1941 |